US007436977B2

(12) United States Patent
Wang et al.

(10) Patent No.: US 7,436,977 B2
(45) Date of Patent: Oct. 14, 2008

(54) EMBEDDING VARIABLE WATERMARK INFORMATION IN HALFTONE SCREENS

(75) Inventors: Shen-ge Wang, Fairport, NY (US); Zhigang Fan, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 653 days.

(21) Appl. No.: 11/043,480

(22) Filed: Jan. 26, 2005

(65) Prior Publication Data
US 2006/0165255 A1 Jul. 27, 2006

(51) Int. Cl.
*G06K 9/00* (2006.01)
(52) U.S. Cl. .................. 382/100; 382/172; 358/3.3
(58) Field of Classification Search ................ 382/100, 382/112, 135, 162, 137–140, 168, 172, 181, 382/191, 194, 201, 203, 221, 232, 237, 243, 382/254, 260, 274, 276, 280–299, 305, 318, 382/321; 358/3.28, 3.3; 380/201
See application file for complete search history.

(56) References Cited

U.S. PATENT DOCUMENTS

| | | | | |
|---|---|---|---|---|
| 5,673,121 A | * | 9/1997 | Wang | 358/3.23 |
| 5,734,752 A | * | 3/1998 | Knox | 358/3.28 |
| 5,790,703 A | * | 8/1998 | Wang | 358/3.28 |
| 6,263,086 B1 | * | 7/2001 | Wang | 382/100 |
| 6,731,409 B2 | * | 5/2004 | Wang | 358/3.28 |
| 7,058,199 B1 | * | 6/2006 | Au et al. | 382/100 |
| 7,295,679 B2 | * | 11/2007 | Otsuki | 382/100 |

OTHER PUBLICATIONS

Wang, S. G. and Knox, K. T., "Embedding Digital Watermarks in Halftone Screens," Proc. Electronic Imaging Conference, 2000; pp. 218-227.*
Wang, S. G. and Knox, K. T., "Embedding Digital Watermarks in Halftone Screens," Proc. Electronic Imaging Conference, 2000, pp. 218-227.
Wang, S. G. "Stoclustic (Stochastic Clustered) Halftone Screen Design," Proc. NIP13: International Conference on Digital Printing Technologies 1997, pp. 516-521.

* cited by examiner

*Primary Examiner*—Seyed Azarian
(74) *Attorney, Agent, or Firm*—Michelle Waites

(57) ABSTRACT

Using correlated stochastic screens, time stamps, text messages, logos and other variable data can be incorporated into printed halftone images in real-time as invisible watermarks. A reference stochastic screen, which is suitable for halftoning the input image, is applied to the grayscale input in locations that lie outside of the watermark. A multi-partitioned watermark halftone screen, which has at least one partition with threshold values that are positively correlated (e.g., identical to) those of the reference stochastic screen and one partition with threshold values that are negatively correlated (e.g., conjugated with) those of the reference stochastic screen, is applied to the grayscale input in locations that are to incorporate the watermark.

18 Claims, 9 Drawing Sheets

EMBEDDING VARIABLE WATERMARK INFORMATION IN HALFTONE SCREENS

Illustrated herein, generally, are systems and methods for embedding variable watermark information in printed digital images during halftoning.

BACKGROUND

The ability to embed invisible information in digital images has gained significant interests in recent years. Embedded data may be used, for example, for copyright control and authentication purposes, and as value-added content in entertainment applications.

Digital image capture devices typically generate image pixels, each of which has a grayscale value that represents one of several available brightness levels. For example, in a device that defines brightness using 8-bit words, each pixel will be capable of displaying one of 256 ($2^8$) different levels of output. Unlike digital image capture devices, digital printers typically provide binary output. Accordingly, grayscale input must be converted to binary output patterns that simulate the continuous tone effect, typically using a halftoning process.

In a typical halftoning process, the grayscale value for each pixel is compared to the threshold value found in a corresponding location of a halftone screen and either a 0 or a 1 is assigned to each location depending upon whether the grayscale value exceeds the threshold. Some devices process grayscale input using "stochastic" halftone screens: threshold arrays that produce high spatial frequency, non-periodic binary output. If the spatial frequency is sufficiently high, the human eye will integrate the individual dots into a continuous tone pattern when the image is viewed.

Halftone screen design is a time consuming and complicated process that is a continuous tone pattern when the image is viewed.

Halftone screen design is a time consuming and complicated process that is typically performed during the design of a digital printer. The halftone screen for a particular printer is pre-stored in memory, then retrieved from storage and applied to the image data during halftoning. It is known to create watermark halftone screens that are based upon reference screens for incorporating a specific watermark into image that are processed using the reference screen.

More specifically, a watermark halftone screen is generated by duplicating the reference screen, obtaining the watermark description and modifying the threshold values in locations of the reference screen corresponding to pixels that will incorporate the watermark. In one embodiment, the modified portion of the watermark halftone screen has threshold values that are substantially conjugate to those in the corresponding region of the reference halftone screen, while the remainder of the watermark halftone screen has threshold values that are identical to those in the corresponding locations of the reference halftone screen. The input image is then halftoned using the watermark halftone screen to generate the watermarked image.

Notably, a stochastic watermark halftone screen can only be designed to generate a specific pattern. In other words, a new watermark halftone screen must be designed in order to incorporate a different watermark into the input image. In addition, unless the halftone screen is designed properly, the watermark may become visible. Thus, incorporating invisible watermarks requires the additional step of optimizing the watermark stochastic screen so its threshold values will closely match those of an idealized stochastic screen. Accordingly, printers that are capable of incorporating digital watermarks are often pre-stored with modified versions of the halftone screen that, when applied to the input image, create output-images with embedded watermarks.

In a one-pass system, grayscale image data is generated, processed and rendered in real-time. Accordingly, the complexity of the stochastic screen design process currently makes it impossible to incorporate watermarks in digital images in real-time due. Further, current processes provide watermarks in relatively small sizes, simple shapes and fixed locations.

Accordingly, it would be advantageous to be able to incorporate watermarks in digital image in real-time and to be able to vary the size, shape and location of the watermark without having to redesign the watermark halftone screen.

PRIOR ART

U.S. Pat. No. 5,673,121 to Wang discloses an idealized stochastic screen characterized by all of the predominant color dots (black or white) uniformly distributed. Pairs of threshold levels are iteratively selected in the screen matrix, and the approach to the idealized stochastic screen is measured. The threshold values are then swapped in position to determine whether the swap improves the measurement and the swap is maintained if the measurement is improved. The process is iterated until the desired result is obtained.

U.S. Pat. No. 5,734,752 discloses producing a document containing a first stochastic screen pattern suitable for reproducing a gray image on a document; deriving at least one stochastic screen description that is related to said first pattern; and producing a second document containing one or more of the stochastic screens in combination. Upon placing the first and second document in superposition relationship to allow viewing of both documents together, correlation does not occur in the area where the derived stochastic screens occur and the image placed in the derived stochastic screen becomes visible.

U.S. Pat. No. 5,790,703 discloses generating watermarks in a digitally reproducible document that are substantially invisible when viewed by producing an image containing a first screen pattern suitable for reproducing a gray image on a document and producing a second image containing the first screen pattern in combination with a conjugate screen description related to the first screen pattern. Upon placing the first and second images in a superposed relationship, conjugate correlation occurs where the first and second screens are found, which causes the image placed therein using the conjugate screens to become visible.

U.S. Pat. No. 6,263,086 discloses a system for retrieving digital watermarks from halftone images that includes scanning or supplying an image to the system, calculating the global autocorrelation of the image, selecting a moving window size, conducting a piecewise localized autocorrelation for each window-sized portion of the image, retrieving the embedded, initially invisible, watermarks, normalizing the resultant image for visualization and displaying the resultant image with the now visible retrieved embedded digital watermarks.

U.S. Pat. No. 6,731,409 to Wang discloses a method for producing color watermarks in digitally reproducible color documents. The color watermarks are generated by producing a halftone pattern, which appears as stochastically distributed dots, in at least one or more color separations of the color document. A second halftone pattern, which also appears as stochastically distributed dots and is spatially displaced from the first halftone pattern, is generated in at least one or more different color separations. Portions of the first and second halftone patterns are correlated or conjugately correlated, therefore, when the two halftone patterns are laid over each other, watermark patterns of highly contrasting colors become markedly visible.

"Embedding Digital Watermarks in Halftone Screens," Wang, S. G. and Knox, K. T., Proc. Electronic Imaging Conference, 2000 discloses embedding invisible watermarks in printed halftone images by varying the spatial correlation of the halftone texture. Once the binary output image is printed on the paper, the correlation of binary codes is converted into physical spatial correlation between one area and another.

S. G. Wang, "Stoclustic (Stochastic Clustered) Halftone Screen Design," Proc. NIP13: International Conference on Digital Printing Technologies 1997 discloses incorporating invisible watermarks in printed halftones images using stochastic halftone screens, rather than incorporating watermarks directly into input images, to cause all images that are halftoned using the screen will automatically possess the watermark information.

SUMMARY

Aspects disclosed herein provide a system that includes a reference screen storage that provides a reference halftone screen that is suitable for halftoning a grayscale input image; a watermark location identifier that provides a watermark location criteria for incorporating a watermark in the grayscale input image; a watermark screen storage that provides at least one watermark halftone screen with threshold values that are negatively correlated with the reference stochastic halftone screen threshold values; a grayscale image input that receives the grayscale input image; and a halftone processor that halftones the grayscale input image by applying the reference stochastic halftone screen to pixels that are identified by the watermark location identifier as being external to the watermark and applying the watermark stochastic halftone screen to pixels that are identified by the watermark location identifier as being internal to the watermark.

In another aspect, a method includes obtaining a reference halftone screen that is suitable for halftoning the input image; obtaining a watermark location criteria for incorporating a watermark in the grayscale input image; generating a partitioned watermark halftone screen independent of a watermark to be incorporated in aid input image, the partitioned watermark halftone screen having a first partition with threshold values that are positively correlated with those of the reference halftone screen and having a second partition with threshold values that are negatively correlated with those of the reference halftone screen; receiving an input image; and halftoning the input image by alternating between the reference halftone screen and the partitioned watermark halftone screen in accordance with the watermark location criteria.

In yet another aspect, a method includes obtaining a reference halftone screen that is suitable for halftoning the input image; obtaining a watermark criteria for incorporating a watermark in the grayscale input image; deriving at least one watermark halftone screen from the reference halftone screen, the at least one watermark halftone screen having threshold values that differ from the reference halftone screen threshold values; receiving an input image; and halftoning the input image by applying the reference halftone screen in locations that are identified by the watermark criteria as being external to the watermark and applying the watermark halftone screen in locations that are identified by the watermark criteria as being internal to the watermark.

DETAILED DESCRIPTION

Figure 1:
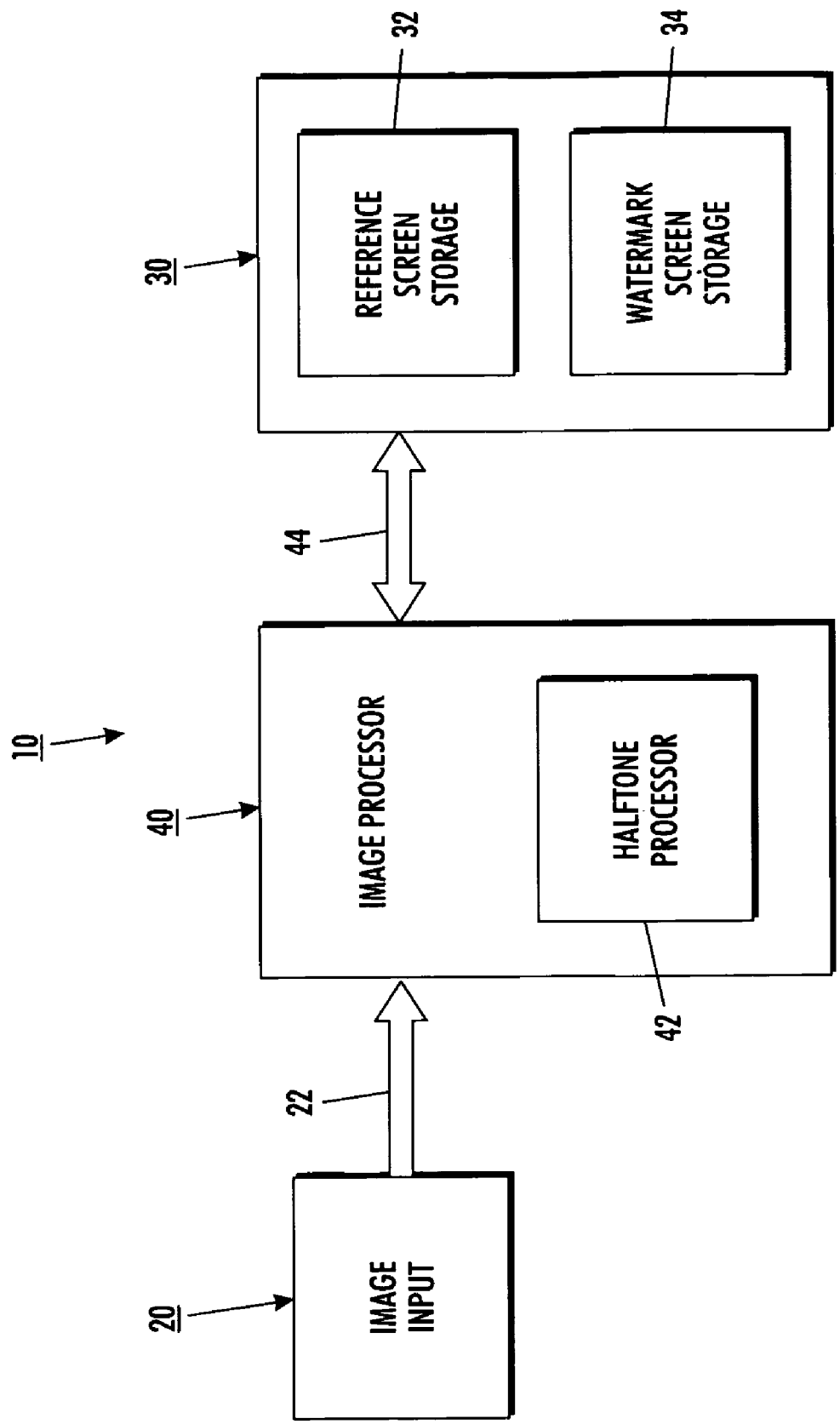
FIG. 1 is a block diagram showing the elements of a typical digital imaging system.

For a general understanding of the various aspects of systems and methods that are disclosed herein, reference is made to the drawings. In the drawings, like reference numerals have been used throughout to designate identical elements. The following term(s) have been used to describe the various aspects of systems and methods that are disclosed:

A "pixel" refers to an image signal that is associated with a particular position in an image. Each pixel has a value that represents the optical density of the image at the associated position.

"Grayscale image data" is information that represents an image using several distinct intensity levels. A "grayscale value" is a numerical value that represents a specified intensity level in a range that varies between a minimum intensity level and a maximum intensity level for a given device.

A "halftone cell" is an array of threshold values that can be used to convert a continuous-tone image into a binary pattern that simulates a specified optical density.

A "halftone screen" is a threshold array values that is formed by replicating a halftone cell over a desired area.

Two halftone screens are "correlated" when they have identical sizes and shapes and they have corresponding threshold values in corresponding locations. For example, two "identical" halftone screens have identical sizes and shapes and have identical threshold values in corresponding locations, while two "conjugated" halftone screens have identical sizes and shapes and have inverse threshold values in corresponding locations. Correlated halftone screens can also described by their degree of correlation, with two identical halftone screens having maximum "positive" correlation and two conjugated halftone screens having maximum "negative" correlation.

Systems and methods that are disclosed herein can be used to embed logos, letters, images and other watermark patterns in images that are output by a digital printer. Watermarks having various shapes, sizes and output locations can be embedded in digital images in real time at a speed of the normal halftoning process. Watermark embedding can be implemented in a printer driver as the document is processed and halftoned for printing. The embedded watermarks can be retrieved later from either a digital file or a hardcopy of the document for visible display.

FIG. 1 shows an exemplary digital imaging system 10 that may be used to incorporate watermarks in digital images. As shown, system 10 includes an image input device (IID) 20, such as a raster input scanner, a digital image file repository or other device that is capable-of generating n-bit grayscale image data 22 and a digital printer 30. System 10 may also include a video monitor, handheld device, or other output device that is capable of displaying m-bit image data (wherein m≦n) in a viewable format and/or one or more devices that are capable of storing such images.

System 10 also includes an image processor (IP) 40, which receives grayscale image data 22 and subjects it to one or more processes. In a system 10 that is capable of generating printed copies of images that are generated by IID 20, IP 40 will typically include a halftone processor 42 that converts grayscale image data 22 to binary image data 44 that is suitable for output by digital printer 30. Generally, halftone processor 42 retrieves a reference halftone screen 50 from reference screen storage 32 and compares the grayscale value of each pixel to the threshold value in the corresponding location of reference halftone screen 50. A "1" is placed in each location were the input exceeds the threshold and a "0" is placed in the remaining locations. Thus, using reference screen 50, halftone processor 42 generates binary output 44 that simulates the appearance of the input image.

In a system 10 that is capable of incorporating watermarks into printed digital images, one or more watermark halftone screens may be stored in a watermark screen storage 34. In such a device, halftone processor 42 may generate printable output that incorporates a visible watermark by retrieving an available watermark halftone screen from storage, comparing the grayscale value of each pixel in the input image to the threshold value in the corresponding location of watermark halftone screen and placing a "1" in each location were the input exceeds the threshold.

Figure 2:
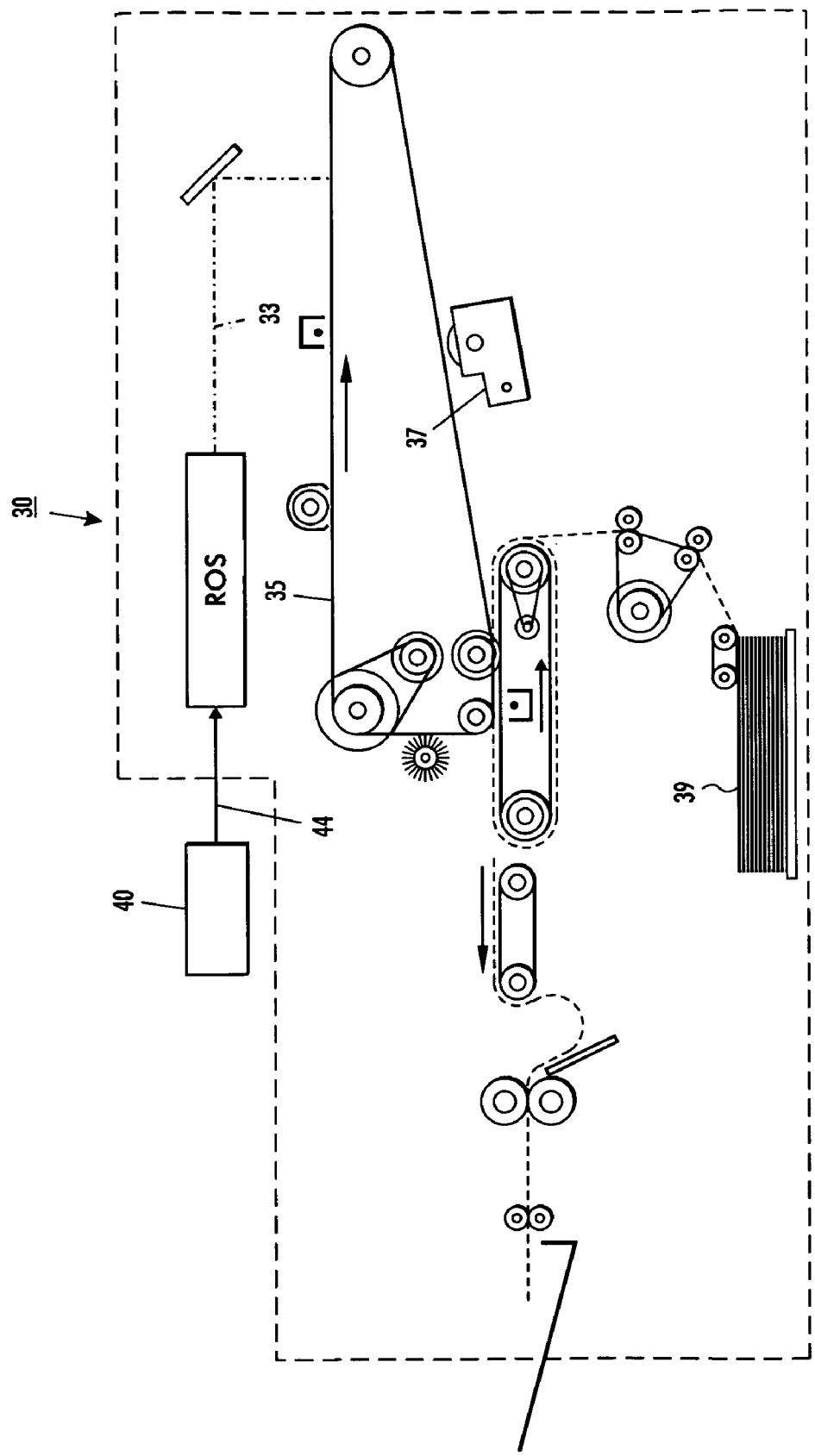
FIG. 2 is an example of a digital printer that may be used to output printed images with embedded invisible information.

Turning to FIG. 2, IP 40 transmits binary image data 44 to printer 30 as a continuous stream of electronic signals that are used to drive a modulated light beam 33 that selectively discharges the surface of imaging member 35 to form a "latent image" in the charge retaining regions. Toner particles 37, which have been polarized to adhere to the latent image, are then deposited onto imaging member 35, thereby providing a developed image that is transferred to an output sheet 39 and permanently fixed thereto. In other words, printer 30 transforms binary image data 42 to printed markings that are displayed on output sheet 39.

Figure 3:
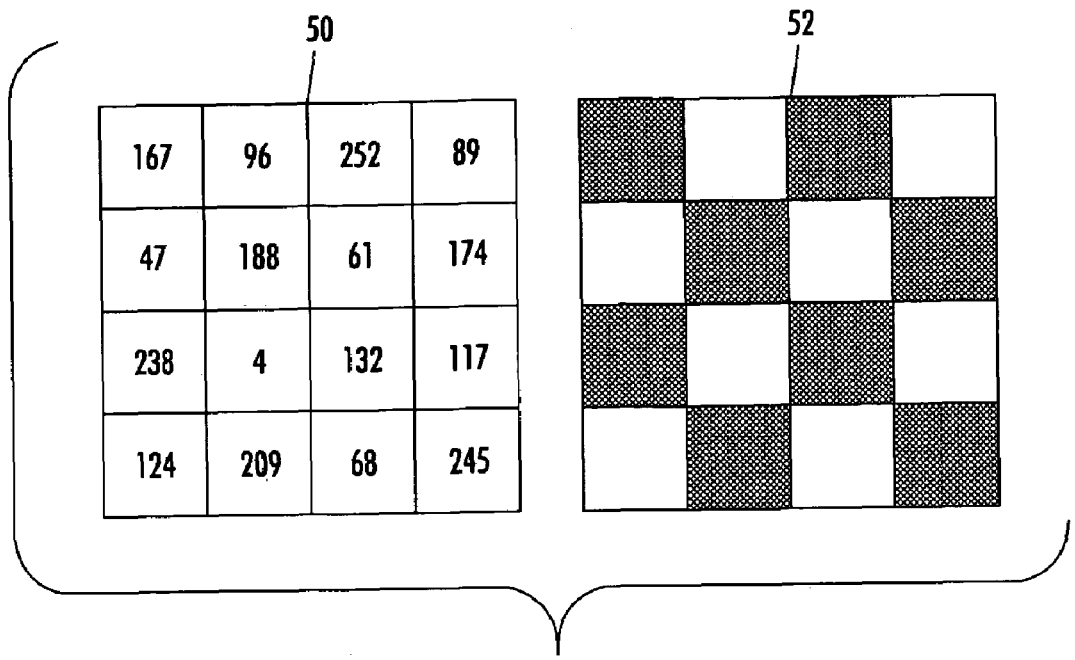
FIGS. 3 and 4 show conjugated halftone screens along with their corresponding binary output patterns.
Figure 4:
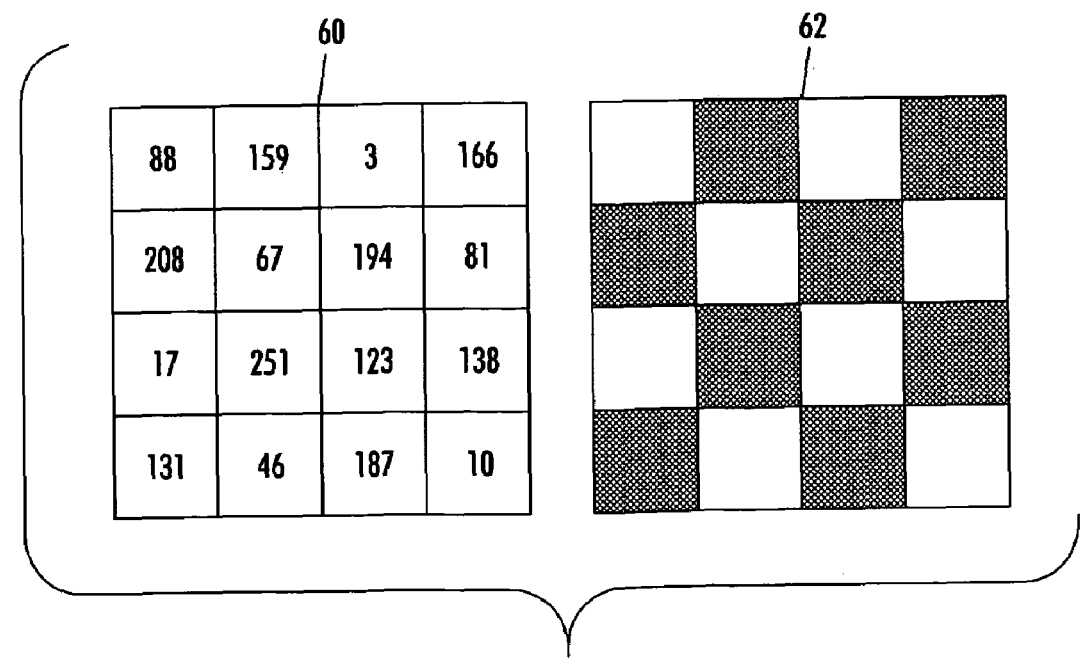

FIG. 3 shows the threshold values for an exemplary reference halftone screen 50 along with the binary output pattern 52 obtained by applying the dithering rule $B(x, y)=1$, where $G(x, y) \geq T(x, y)$; $B(x, y)=0$, where $G(x, y) < T(x, y)$ and depositing marking material in each location where $B(x, y)=1$. FIG. 4 shows the threshold values for a halftone screen 60 that is conjugated with reference halftone screen 50 along with the binary output pattern 62 obtained by applying the dithering rule described above to halftone screen 60. As shown, reference halftone screens 50 and its conjugated halftone screen 60 will have threshold values $T_2(x, y)=M-T_1(x, y)$, where M is the total number of gray levels that are received by IP 40. Identical halftone screens will have identical threshold values $T_1(x, y)=T_2(x, y)$.

Figure 5:
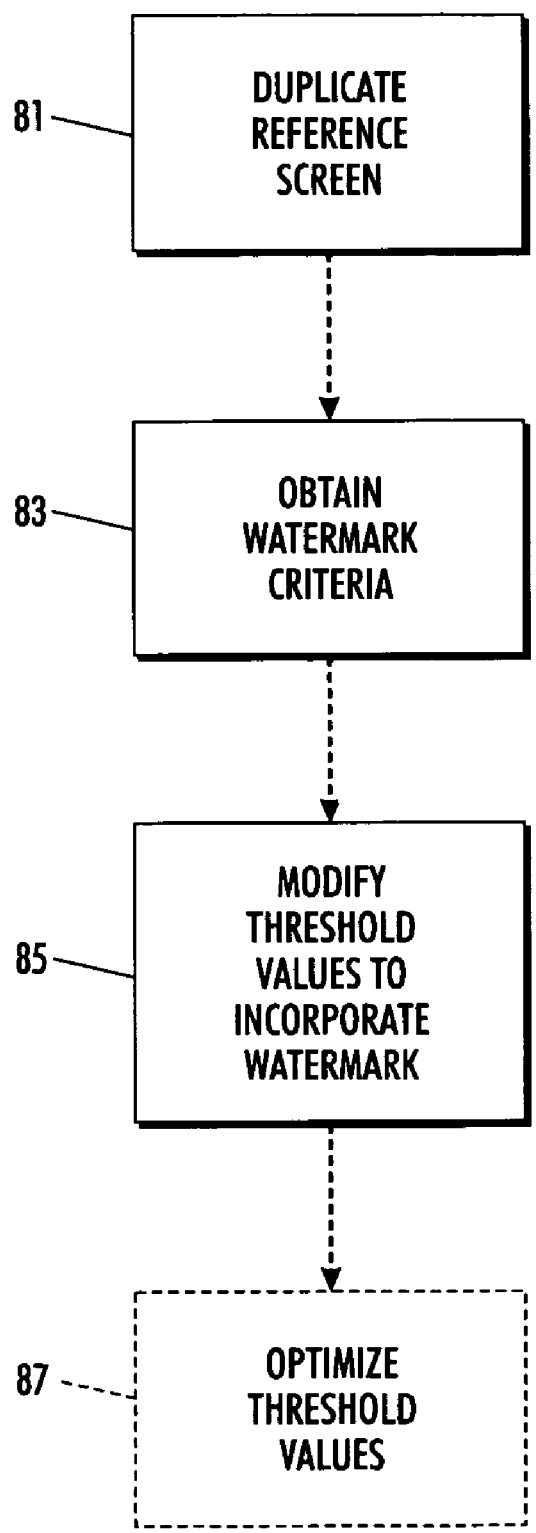
FIG. 5 is a block diagram illustrating a known method of generating a watermark halftone screen.

FIG. 5 is a block diagram showing a general illustration of a known method 80 of generating a watermark halftone screen that may be pre-stored in watermark screen storage 34 and used to halftone grayscale image data 22. The reference halftone screen 50 for printer 30 is duplicated at block 81 and the criteria for the specific watermark that is to be embedded in the input image, i.e., the shape, size, color, and location are obtained at block 83. At block 85, the threshold values of the duplicated screen are then modified based upon the watermark criteria in the locations corresponding to the pixels that are internal to the watermark.

The watermark halftone screen may be subjected to additional processing to incorporate an invisible watermark in grayscale image data 22. More specifically, to incorporate an invisible watermark in grayscale image data 22, the watermark halftone screen is optimized to "smear out" the seam between adjacent halftone cells. During optimization, the threshold values are modified so they will closely match those of an idealized stochastic screen. The watermark halftone screen is then stored in watermark screen storage 34 (see FIG. 1). In fact, a digital printer may have several watermark halftone screens stored in watermark screen storage 34, each having been designed to incorporate a different watermark in the input grayscale image data 22.

Figure 6:
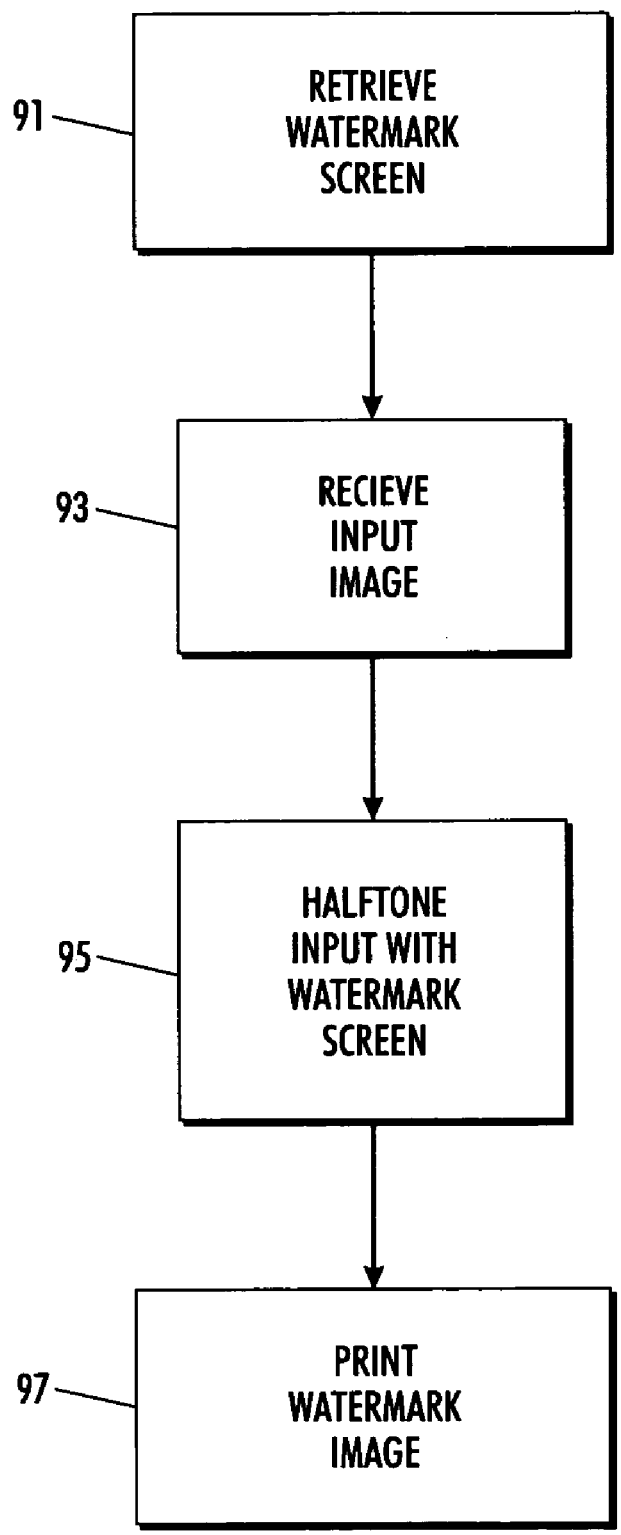
FIG. 6 is a block diagram showing a known method of generating a printed image with invisible information incorporated therein.

Turning to FIG. 6, to print an image that bears a watermark, a user selects the desired watermark criteria, causing the corresponding watermark halftone screen to be retrieved from watermark screen storage 34 at block 91. The grayscale input image is received at block 93 and the watermark halftone screen is used to halftone the input at block 95. The binary image data 44 is then output by printer 30 at block 97, generating a printed image with the watermark embedded in accordance with the user input.

While portions of the input image will be halftoned using different screens, the halftone patterns that are generated by the two screens look approximately identical when they are viewed individually because the two screens are both based on the same stochastic screen optimization. However, when one pattern is properly aligned and superposed on the other, the existence of both identical and conjugated relationships in the two images becomes apparent. Accordingly, watermark detection is performed by scanning and digitizing the watermarked image and electronically superimposing the output of the conjugate of reference screen 50 on the scanned image.

Known watermarking methods print hardcopy images with embedded watermarks by applying a single watermark halftone screen to grayscale image data 22 as it is halftoned. These methods require the use of a watermark halftone screen that has been specifically designed to incorporate a predefined watermark into each input image that is processed using the screen. Present systems and method separate the time consuming watermark design process from the process of printing watermarked images, which enables watermarks to be incorporated in real-time. Further, since present systems do not embed watermarks that relate to a specific design, watermarks can be embedded in variable shapes, sizes and locations.

Figure 7:
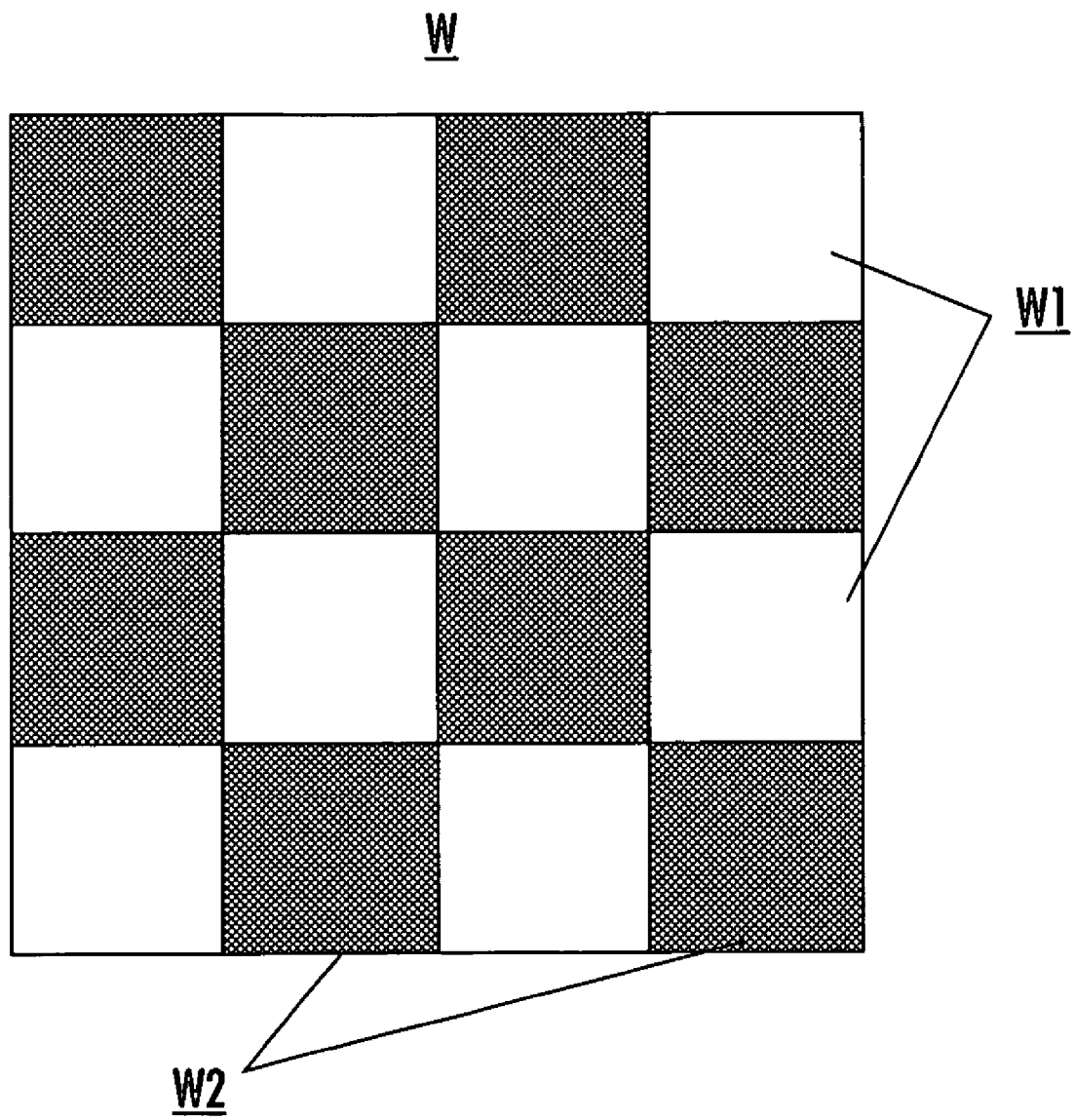
FIG. 7 provides an example of a dual-partitioned halftone screen that may be used to embed invisible, variable information in a digital image.

FIG. 7 shows an example of a watermark halftone screen W that can be used to embed variable watermark information in a grayscale input image using a typical halftoning process. In one aspect, a dual-partitioned watermark halftone screen W has a first partition W1, which corresponds to the white blocks of W, with threshold values that ate conjugated with those of the reference screen 50 and a second partition W2, which corresponds to the black blocks of W, with threshold values that are identical to those of reference screen 50. The blocks that compose $W_1$ and $W_2$ may, for example, be squares with sizes of 4×4, 8×8, or 16×16 pixels.

It is noted that while the watermark halftone screen W shown in FIG. 7 is shown as a checkerboard pattern, present systems and methods are not limited to being arranged in such a pattern. Generally, watermark halftone screen W may be arranged in any way that screens the pixels of grayscale image data 22 inside the watermark independently of the pixels outside the watermark. It is also noted that present systems and methods may be used with watermark halftone screens that include three or more partitions.

Present systems and methods use the criteria for a selected watermark to identify the pixels of grayscale image data 22 that will incorporate a selected watermark. In other words, the watermark criteria are used to classify each grayscale image data 22 pixel as either being internal to watermark or external to watermark. Accordingly, hardcopy images can be printed with embedded watermarks by applying portions of multiple halftone screens to a given grayscale input image.

Each location of the input image is processed by comparing the grayscale value of the corresponding pixel to the threshold value in the corresponding location of one of a plurality of halftone screens that will be used to halftone the image, with the halftone screen that will be used to process each location selected based upon the watermark criteria.

Figure 8:
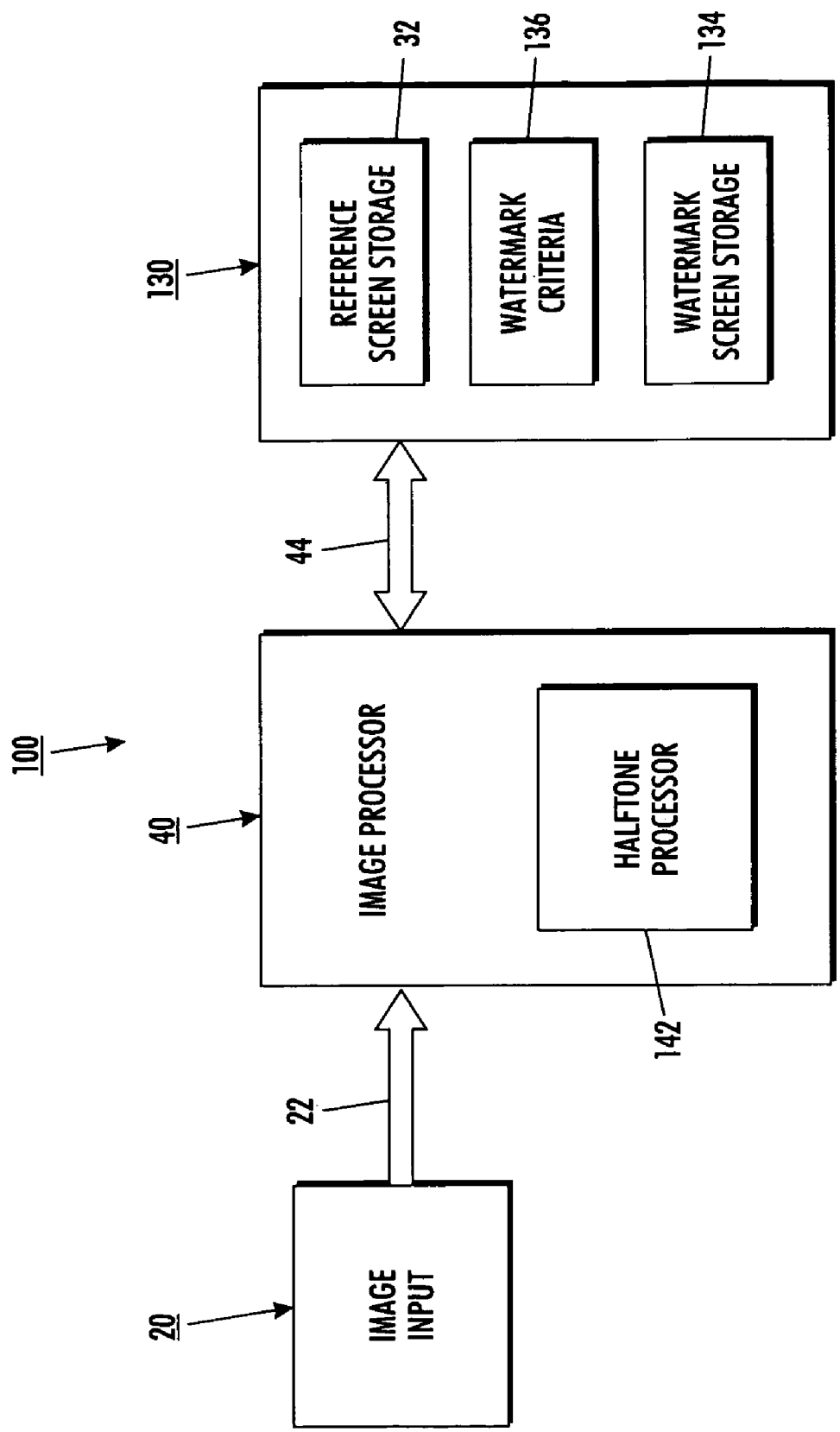
FIG. 8 illustrates a digital imaging system that can be used to incorporate variable watermark data in a grayscale input image.

A system 100 that is capable of generating hardcopy images that incorporate variable watermark data is illustrated FIG. 8. As shown, system 100 includes an IID 20, an IP 40 and a printer 130. Printer 130 includes a reference screen storage 32, a watermark screen storage 134 and a watermark criteria source 136. In one aspect, a plurality of watermark halftone screens $W_1$, $W_2$, $W_3$, etc., each having a different degree of correlation with reference screen 50, are stored in watermark screen storage 134.

In one aspect, halftone processor 142 of system 100 includes a halftone screen selector that selectively applies one of a plurality of available halftone screens to the input image, based upon the watermark criteria. Generally, halftone processor 142 selectively applies reference screen 50 and one or more watermark halftone screens $W_1$, $W_2$, $W_3$, etc. to the input image. Accordingly, halftoning the input image by alternating between two halftone screens, rather than by designing and applying a specially designed halftone screen, present systems and methods are capable of incorporating variable watermark data in real-time.

In another aspect, present systems and methods use the criteria for a selected watermark to combine partitions $W_1$ and $W_2$ from two different halftone screens as a watermark halftone screen W. More specifically, a dual-partitioned watermark halftone screen W may be generated by placing the threshold value from each partition W1 at each location that corresponds to a pixel that is internal to watermark, while the threshold values from partition $W_2$ will be placed at each location that corresponds to a pixel that lies external to watermark.

Generally, halftone processor 142 applies reference screen 50 to locations of the input image that are external to the watermark. In one aspect, halftone processor 142 applies a watermark halftone screen $W_1$ that is conjugated with reference screen 50 to locations of the image that are internal to watermark. In another aspect, halftone processor 142 applies a watermark halftone screen $W_2$ that is partially negatively correlated with reference screen 50. Since present systems and methods use the criteria for a watermark that will be incorporated in the input image, rather than specially designed watermarked halftone screens, to generate printed watermarked images, they can incorporate watermarks that have a desired shape, size, color and location without requiring the use of a specially designed watermark halftone screen.

Figure 9:
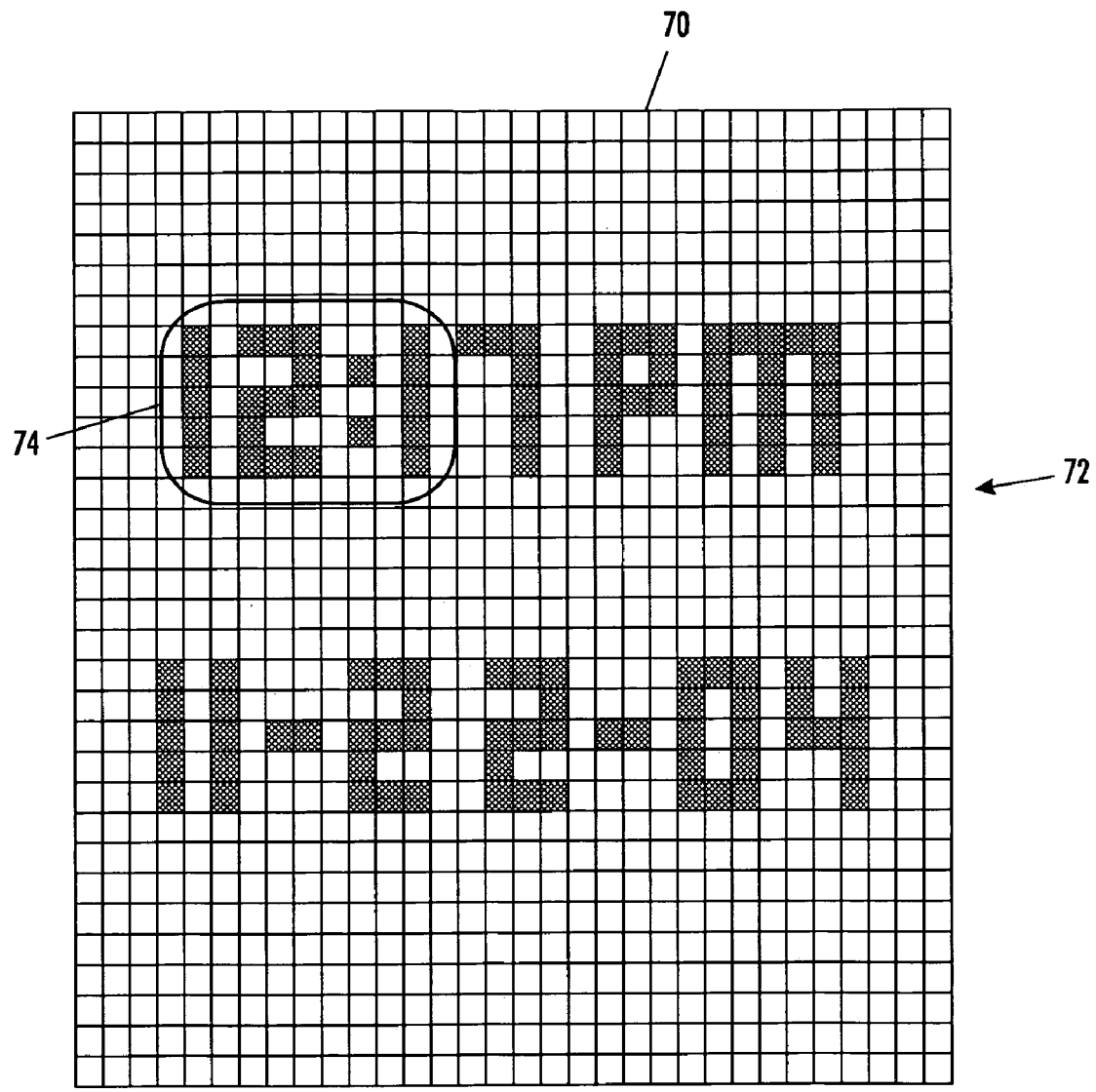
FIG. 9 provides an example of a watermark that has been incorporated in a printed image using a known watermarking method.
Figure 10:
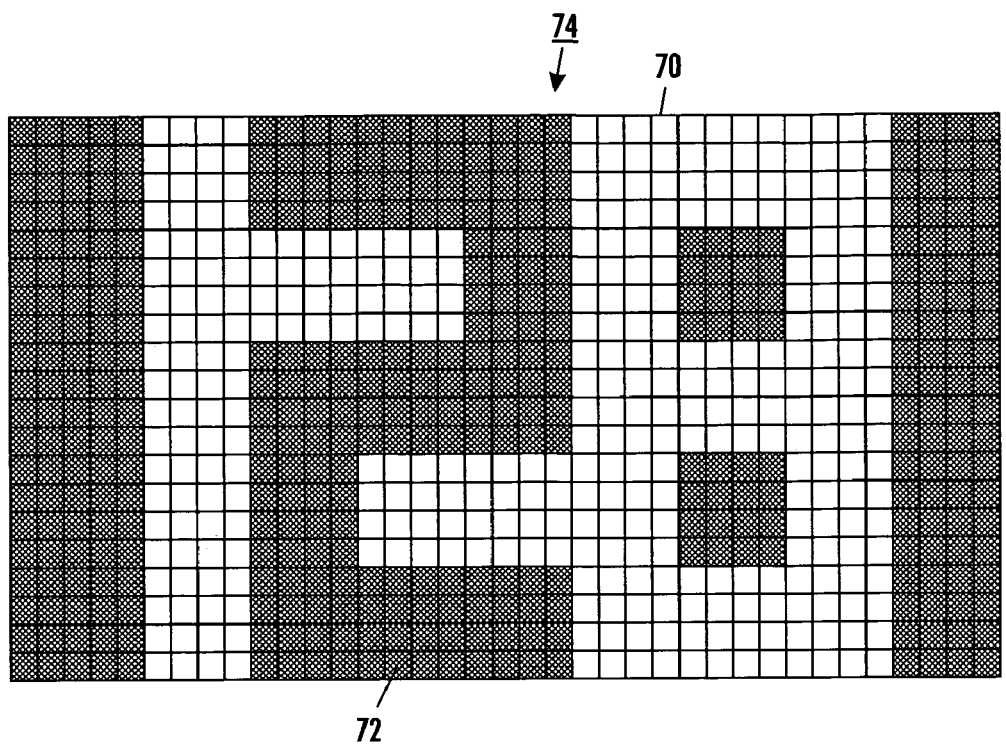
FIG. 10 is a close up view of the watermark illustrated in FIG. 11.

FIG. 9 provides an example of a watermark 72 that has been incorporated in a printed image 70 using the above described watermarking method. In the example shown, watermark 72 displays the time and date. As explained earlier, the design of a watermark screen, particularly an idealized stochastic halftone screen, is a very complicated and time consuming process. Accordingly, the halftone screen used to incorporate watermark 72 must be designed well in advance of the time it is used to halftone the image. Thus, while watermark 72 may display a time and date, it will not typically display the time and date watermark 72 is embedded in the image. Further, the same time and date will be displayed in each image that is halftoned using watermark specially designed watermark halftone screen. FIG. 10 is a detailed illustration of the circled portion 74 of watermarked printed image 70 of FIG. 9.

Figure 11:
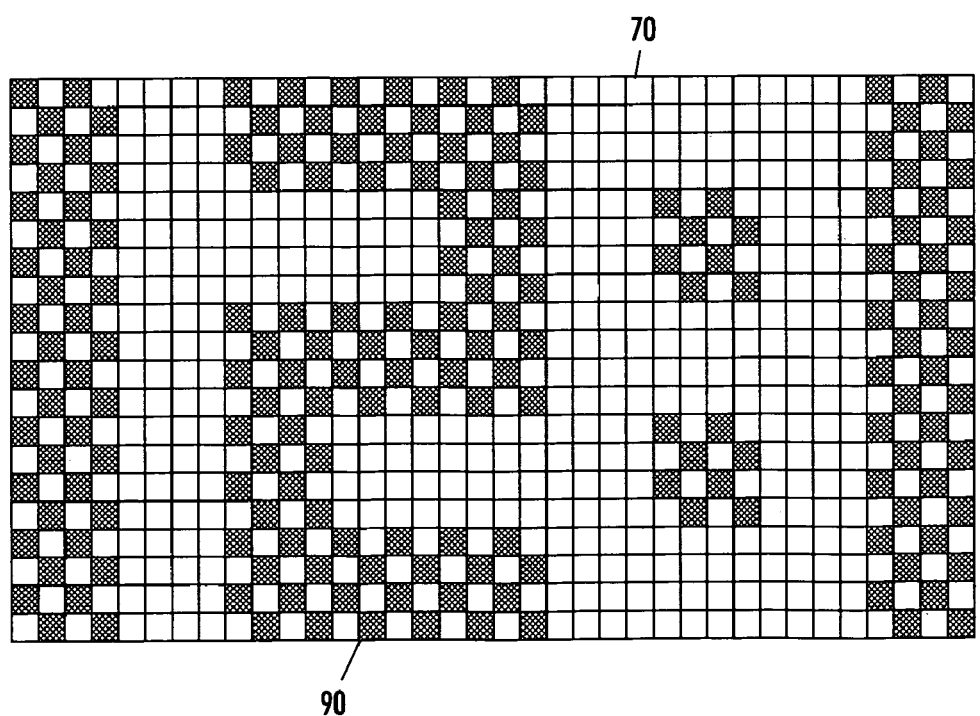
FIG. 11 is a close up view of a printed image that incorporates variable watermark information that is similar to the watermark shown in FIG. 10.

As shown in FIG. 11, present systems and methods can be used to print hardcopy images 70 that incorporate variable data as watermarks 90. In the example shown, watermark 90 is formed from variable data that provides the current date and time. Significantly, variable data 90 can be incorporated into grayscale image data 22 in real-time and at any location in grayscale image data 22.

As explained above, halftone processor 142 obtains reference stochastic screen 50, watermark location criteria and watermark screen W and halftones the input image by selectively applying reference screen 50 and watermark screen W in accordance with the watermark criteria. In the example shown, watermark halftone screen W has been formed from 4×4 pixel blocks. Date and time information, which may be received, for example, via a communication link, can be incorporated into grayscale image data 22 based upon the watermark criteria. More specifically, variable data 90 can be incorporated in a printed image by halftoning grayscale image data 22 with a plurality of halftone screens, with reference screen 50 applied in locations that correspond to pixels that are identified by the watermark criteria as being external to watermark 72 and watermark halftone screen W applied in locations that correspond to pixels that are identified by the watermark location criteria as being internal to watermark 72.

As present systems and methods do not require designing a watermark screen for a particular watermark, watermarks can be embedded in an input image quickly enough to keep up with image capture. Since the watermark partition is not in a fixed location, watermarks can be embedded in input images in varying sizes and shapes and at various locations in the output image. Notably, the spatial arrangements for randomly generated patterns and images such as text messages, serial numbers, time stamps and real-time data, can be forwarded to IP 40 and embedded in output images during rendering.

Although various aspects of systems and methods that are disclosed have been described with reference to specific embodiments, it is not intended to be limited thereto. Rather, those having ordinary skill in the art will recognize that variations and modifications, including equivalents, substantial equivalents, similar equivalents, and the like may be made therein which are within the spirit of the invention and within the scope of the claims.

What is claimed is:

1. A method of incorporating a watermark into a digital image, comprising:
   obtaining a reference halftone screen that is suitable for halftoning said input image;
   obtaining a watermark location criteria for incorporating a watermark in said grayscale input image;
   generating a partitioned watermark halftone screen independent of a watermark to be incorporated in said input image, said partitioned watermark halftone screen having a first partition with threshold values that are positively correlated with those of said reference halftone screen and having a second partition with threshold values that differ from those of said reference halftone screen;

receiving an input image; and halftoning said input image by alternating between said reference halftone screen and said partitioned watermark halftone screen in accordance with said watermark location criteria.

2. A method as claimed in claim 1 wherein said second partition threshold values are negatively correlated with those of said reference halftone screen.

3. A method as claimed in claim 2 wherein said first partition has threshold values that are identical to those of said reference stochastic halftone screen and said second partition has threshold values that are conjugated with those of said reference stochastic halftone screen.

4. A method as claimed in claim 3 further comprising halftoning said image data by applying said partitioned watermark halftone screen to image locations identified by said watermark location criteria for incorporating said watermark.

5. A method as claimed in claim 4 further comprising applying said reference halftone screen to image locations not identified by said watermark location criteria for incorporating said watermark.

6. A method as claimed in claim 3 further comprising optimizing said threshold values for said partitioned watermark stochastic halftone screen in locations that are conjugated with said reference halftone screen.

7. A method as claimed in claim 3 further comprising:
specifying a block size; and
identifying the output value for pixels corresponding to said first and second partitions.

8. A method as claimed in claim 7 wherein said block size is selected based upon an intended use of said halftoned input image.

9. A method as claimed in claim 7 wherein said block size is 8 pixels×8 pixels.

10. A method as claimed in claim 7 further comprising segregating said reference stochastic halftone screen into 4 pixel×4 pixel watermark blocks.

11. A method of incorporating a watermark into a digital image, comprising:
obtaining a reference halftone screen that is suitable for halftoning said input image;
obtaining a watermark criteria for incorporating a watermark in said grayscale input image;
deriving a partitioned watermark halftone screen independent of a watermark to be incorporated in the digital image, said partitioned watermark halftone screen having a first partition with threshold values that differ from those in corresponding locations of said reference halftone screen, wherein said partitioned watermark halftone screen first partition has threshold values that are conjugated with those in corresponding locations of said reference halftone screen;
receiving an input image; and
halftoning said input image by applying said partitioned watermark halftone screen to input pixels in locations identified by said watermark criteria for incorporating said watermark.

12. A method as claimed in claim 11 further comprising applying said reference halftone screen to input pixels in locations not identified by said watermark criteria for incorporating said watermark.

13. A system, comprising:
a reference screen storage that provides a reference halftone screen that is suitable for halftoning a grayscale input image;
a watermark location identifier that provides a watermark location criteria for incorporating a watermark in said grayscale input image;
a watermark screen storage that provides at least one watermark independent watermark halftone screen, said watermark screen having a watermark screen partition with locations with threshold values that are conjugated with said reference stochastic halftone screen threshold values and watermark stochastic halftone screen with threshold values that are negatively correlated with said reference halftone screen threshold values;
an image processor that receives said grayscale input image; and
a halftone processor that halftones said grayscale input image by applying said watermark halftone screen to pixels identified by said watermark location identifier as being included in said watermark.

14. A system as claimed in claim 13 wherein said reference halftone screen and said watermark halftone screen are stochastic halftone screens.

15. A system as claimed in claim 14 wherein said halftone processor converts said grayscale input image to said watermarked output image by applying said partitioned watermark halftone screen to said grayscale input image in locations identified by said watermark location criteria as being watermark embedding locations and applying said reference halftone screen to remaining locations of said grayscale input image.

16. A system as claimed in claim 15 further comprising a digital scanner that generates said grayscale input image as a digital representation of an image displayed on a hardcopy document.

17. A system as claimed in claim 15 wherein said watermark halftone screen generator further comprises a stochastic screen optimizer that modifies said partitioned watermark stochastic screen threshold values in locations that are conjugated with said reference screen to approximate an idealized stochastic screen.

18. A system as claimed in claim 15 further comprising a digital output device that receives said image processor halftoned grayscale image data and provides digitally watermarked hardcopy reproductions of said input image 18.

* * * * *